United States Patent [19]

Werner et al.

[11] 4,366,292
[45] Dec. 28, 1982

[54] MIXED POLYOLEFINIC COMPOSITIONS

[76] Inventors: Raymond J. Werner, 171 Woodcliff Ave., Woodcliff Lake, N.J. 07675; William J. Jennings, 263 Bayridge Pkwy., Brooklyn, N.Y. 11209; Daniel L. Crowley, 97 Continental Ave., Forest Hills Gardens, N.Y. 11375; Frank J. Smith, 38 Sargent Rd., Scarsdale, N.Y. 10583

[21] Appl. No.: 229,559

[22] Filed: Jan. 29, 1981

Related U.S. Application Data

[63] Continuation of Ser. No. 119,428, Feb. 7, 1980, abandoned, which is a continuation-in-part of Ser. No. 680,384, Apr. 26, 1976, abandoned.

[51] Int. Cl.³ .................... C08L 23/06; C08L 23/12; C08L 23/16
[52] U.S. Cl. .................................. 525/240; 525/211; 525/98; 524/528
[58] Field of Search ............................. 525/240, 211

[56] References Cited

U.S. PATENT DOCUMENTS 3,846,349 11/1974 Harada et al. ............... 260/2.5 HA
3,919,164 11/1975 Hattori et al. ................. 260/42.46

FOREIGN PATENT DOCUMENTS 927881 6/1963 United Kingdom .............. 260/897
1136115 12/1968 United Kingdom .............. 260/897

OTHER PUBLICATIONS

Exxon–Elastomers for Polyolefin Modification, 1975, pp. 1–64.

*Primary Examiner*—Carman J. Seccuro

[57] ABSTRACT

Polyolefenic compositions are formed from a mixture of polyethylene and amorphous polypropylene, or a mixture of isotactic polypropylene, amorphous polypropylene and polyethylene, wherein the polyolefenic compositions are forced under heat and pressure through a shaping die thereby forming a geometrically-shaped polyolefenic article having a non-tacky surface. The compositions can have additives, fillers and other polymeric resins incorporated therein for modification of the physical and chemical properties of the polyolefenic compositions.

4 Claims, No Drawings

MIXED POLYOLEFINIC COMPOSITIONS

This is a continuation of application Ser. No. 119,428, filed Feb. 7, 1980, now abandoned, which in turn is a continuation-in-part of Ser. No. 680,384, filed Apr. 26, 1976, now abandoned.

FIELD OF THE INVENTION

Polyolefenic compositions are formed from a mixture of polyethylene and amorphous polyethylene, or a mixture of isotactic polypropylene, amorphous polypropylene and polyethylene, wherein the polyolefenic compositions are forced under heat and pressure through a shaping die thereby forming a geometrically-shaped polyolefenic article having a non-tacky surface. The compositions can have additives, fillers and other polymeric resins incorporated therein for modification of the physical and chemical properties of the polyolefenic compositions.

BACKGROUND OF THE INVENTION

Amorphous polypropylene has been historically used in the hot melt adhesives, hot melt pressure sensitive adhesives, carpet backing area, emulsifiable polypropylene wax area and asphalt area as a property modifying agent. A number of U.S. patents exist in the aforementioned and they are U.S. Pat. Nos.: 3,132,027; 3,220,966; 3,264,167; 3,492,372; 3,503,777; 3,573,240 and 3,577,372. The aforementioned patents are non-applicable to our present invention wherein a polyolefenic article having a non-tacky surface is formed.

SUMMARY OF THE INVENTION

In order to reduce the overall raw material cost of a polyethylene formed article from both a raw material cost as well as a processing cost in view of the torque requirements and electrical power demand, this invention provides unique and novel compositions of matter which have mixtures of a polyethylene resin and an amorphous polypropylene or mixtures of polyethylene, amorphous polypropylene and isotactic polypropylene as well as unique and novel methods of manufacturing these articles.

An object of our present invention is to provide unique and novel compositions of matter for forming polyolefenic articles from blends of polyethylene and amorphous polypropylene or blends of polyethylene, amorphous polypropylene and isotactic polypropylene.

GENERAL DESCRIPTION

The polymeric blends of the instant invention which have non-tacky surfaces are formed from homogenous blend mixtures of a polyethylene resin and amorphous polyethylene resin or a polyethylene resin an amorphous polypropylene resin and an isotactic polypropylene resin.

The polyethylene resin employed in the blend composition of the instant invention are selected from the group comprising low density polyethylene having a density of less than about 0.926 grams per cubic centimeter, medium density polyethylene having a density of about 0.926 to about 0.940 grams per cubic centimeter or high density polyethylene having a density greater than 0.940 grams per cubic centimeter, wherein the polyethylene resin has a melt index of at least about 0.05, more preferably at least about 0.1, and a molecular weight of at least about 7,000 to about 250,000, more preferably about 9,000 to about 225,000, and most preferably about 11,000 to about 200,000. Typical examples of polyethylene resins are low density polyethylene resins: (LD-100 Exxon) having a density of 0.922 grams per cubic centimeter and a melt index of 2.0; Arco 1000 F having a melt index of 0.2; Gulf 1018 having a melt index of 12; Chemplex 1016 having a melt index of 3.7; Chemplex 1026 having a melt index of 23; medium density polyethylene resin; Chemplex 3020 having a melt index of 3 and a density of 0.935 grams per cubic centimeter; and high density polyethylene resins: Chemplex 5602 having a melt index of 0.2 and a density of 0.954 cubic centimeters; Chemplex 5250 having a density of 0.955 and a melt index of 25; Chemplex 6001 having a melt index of 0.15. Additionally, these polyolefinic resins can be copolymers with ethylene vinyl acetate or methyl methacrylate, wherein the weight % of comonomer is less than about 15 wt.%, more preferably less than about 10 wt.%. Ethylene ethyl acrylate is also a suitable copolymer.

The amorphous polypropylene resins employed in the instant invention have a viscosity at 375° F. of about 10 to about 300,000 cps. more preferably about 50 to about 100,000, cps still more preferably about 200 to about 15,000 cps and most preferably about 300 to about 7,000 cps and a molecular weight of about 200 to about 200,000, more preferably about 300 to about 150,000 and most preferably about 300 to 50,000.

The isotactic polypropylene resins in the instant invention have a density of at least about 0.900 grams per cubic centimeter and a melt flow of at least about 0.5, more preferably at least 1. Typical examples of isotactic polypropylene resins are Profax 6323 (Hercules) having a melt flow of 12 and a density of 0.903 grams per cubic centimeter.

The blend compositions of amorphous polypropylene resin and the polyethylene resin have about 1 to about 55 wt.% of amorphous polypropylene resin and most preferably about 4 to about 40 wt.% of the amorphous polypropylene resin.

The blend compositions of polyethylene resin, isotactic polypropylene resin, and amorphous polypropylene resin have; about 1 to about 30 wt.% of the isotactic polypropylene resin, more preferably about 3 wt.% to about 25 wt.% and most preferably about 5 wt.% to about 20 wt.%; and about 10 wt.% to about 60 wt.% of the amorphous polypropylene resin, more preferably about 10 wt.% to about 50 wt.% and most preferably about 10 to about 45 wt.%.

Various additives can be incorporated into the blend compositions for modification of physical and rheological properties, therein these additives are selected from the group consisting of slip agents such as oleamide (Armak) erucamide, stearamide, or behenamide and mixtures thereof, antiblock agents such as Celite 219 (John's Manville Co.); ultraviolet stabilizers such as UV 531 or UV 1084 (American Cyanamid) blowing agents such as AZ 120 (Uniroyal) or a fluorohydrocarbon, antiodidants such as BHT or Irganox 1010 (Ciba Giegy), lubricants such as metallic stearates (sodium stearate, calcium stearate, magnesium stearate, zinc stearate) antistatic agents such as Armostat 310 (Armak), optical brightness or biodegradable agents.

These additives are incorporated into the blend compositions at a concentration level of about 0.05 to about 50 wt.%, wherein mixtures of the additives can be employed.

Additionally, at least one pigment and/or filler can be incorporated into the blend compositions for modification of physical and rheological properties. The pigments can be selected from the group consisting of inorganic or organic pigments and mixtures thereof. Typical inorganic pigments are titanium dioxide, iron blue, cadium pigments, chrome yellow, molybdate orange, ultramarine blue, iron oxide, brown oxide, molybdate red, zinc oxide, zinc chromate, chrome green, chromium oxide, ultramarine green, metallic flakes (bronze, gold, copper), or pearliscent flake. Typical organic pigments are vats, acid dyes, basic dyes, anthraquinones, thioindigos, Red Lake C, Red 23, Benzidine yellow, Benzidine orange, dioxanes, Irgazin, Irgalities, phthalocyanines, carbon blacks, azos, or perylenes and mixtures thereof.

The concentration of pigment is at least about 0.1 wt.%, more preferably at least about 0.15 wt.%, and most preferably at least about 0.20 wt.%. Typical fillers employed in the instant compositions are calcium carbonates, clays, talcs, wallostonites, or metallic silicates. The fillers are incorporated into the blend compositions at a concentration level of about 1 to about 60 wt.%, more preferably about 5 to about 50 wt.%, and most preferably about 10 to about 40 wt.%. Preferred fillers are calcium carbonate such as Camel Tex or a clay.

Other thermoplastic polymeric resins can be incorporated in the blend composition at a concentration level of about 2 to about 20 wt.%, more preferably at about 3 to about 15 wt.%. Typical examples are ethylene vinyl acetates (eg duPont 3180 or 3185), ethylene methyl methacrylates, ethylene ethyl acrylate, ethylene acrylic acid or ethylene carboxylate acid.

Various fibrous materials can be incorporated into the blend compositions at a concentration level of about 15 to about 25 wt.%. These fibrous materials are selected from the group comprising chopped glass strands, dacron fibers, chopped rages and asbestos fibers.

Rubberlike (elastomeric) materials can be incorporated into the blend composition at a concentration level of about 2 to about 25 wt.%, more preferably at about 3 to about 20 wt.%, and most preferably at about 5 to about 15 wt.% thereby modifying the physical and rheological properties of the blend compositions. Typical rubberlike materials are Kraton 2111 (Shell), Soloprene 414 (Phillips), Vistation 702 (Exxon), Rytrel or natural rubber.

The process of the instant application can be generally described as the extrusion of a polymeric homogenous blend to produce a polyolefinic article having a non tacky surface, wherein a polyethylene resin is fed into a heated extruder having a screw with an L/D ratio of at least about 24/1 and a mixing section wherein the extruder is vented. The polyethylene resin can optionally blended with an isotactic polypropylene resin, fillers, pigments or additives or the amorphous polypropylene resin. Preferably the amorphous polypropylene is liquified and injected into the extruder, wherein it is blended with the polyethylene resin in the mixing section of the extruder thereby forming the polymeric homogenous blend which is extruded through the extruder and forced outwardly through an exit port of the extruder to form the polyolefenic article having a non tacky surface upon subsequent cooling.

The blend compositions can be formed by compounding in an extruder wherein the pellets of isotactic polypropylene resin and low density polyethylene resin as well as the filler, pigment and additives are fed through the feed throat into the feed section of an extruder which has a feed section, a transition section and a metering section wherein the screw of the extruder has an L/D of at least about 20/1. The amorphous polypropylene in a flakelike form can also be fed into the extruder through its feed throat or alternatively the amorphous polypropylene resin can be liquedified at 375° F. and pumped through the valve means into the extruder either in the feed, transition or metering sections.

A cram feeder can be employed to force the pellets downwardly in the feed throat of the extruder, wherein the extruder can have a vent disposed therein which can be attached to a vacuum line. Typical extruders incompassed within the scope of this invention are single stage extruders, extruders having ball valves therein, sterling transfer extruders, Kneader extruders having screws with intensive mixing pins disposed therein, extruders with static mixing heads, extruders with multi-stage screws, extruders having a screw having a mixing section disposed therein, extruders having double meter screws and a plurity of extruders joined in tandem by at least one union member, wherein the union meter can have a vent disposed therein.

The profile temperature of the extruder is at least 200° F., more preferably higher and in many cases the extruder could be operated adiabatically. The torque requirements for extrusion are lowered by the incorporation of the amorphous polypropylene resin thereby requiring less electrical power. The end of the extruder and its exitport is affixed a shaping die through which the polyolefenic composition is extruded into the final shape.

DESCRIPTION OF THE PREFERRED EMBODIMENT

As preferred or exemplary embodiments of the instant invention, this invention relates to the improved blend compositions formed from mixtures of polyethylene resins and amorphous polypropylene resins or polyethylene resins, amorphous polypropylene resins and isotactic polypropylene resins.

The following examples are given to aid in the understanding of the instant invention. It is understood, however, that the invention is not limited to the specific compositions, methods of forming the thermoplastic articles, or even the formed articles themselves.

EXAMPLE I

Thermoplastic film was extruded through an extruder at about 300° to about 375° F., wherein the screw had an L/D of about 20/1. The mil thickness of the film was from about 0.4 to about 15 mils. The films exhibited excellent dispersion without any apparent gel formulation or pinholing and had improved physical properties such as index of refraction and elongation.

The plastic film had good heat seal properties. The ingredients were blended and fed into the throat of the extruders. Some of the formulas are:

|     |       |      | Wt. % |
| --- | ----- | ---- | ----- |
| (A) | LD    | 100  | 1 |
|     | R     | 1000 | 99 |
|     |       |      | Film Gauge - 15 mils |
| (B) | LD    | 100  | 70 |
|     | R     | 100  | 30 |
|     |       |      | Film Gauge - 0.4 mils |

-continued

| | | Wt. % |
|---|---|---|
| (C) | LD 100 | 60 |
| | R 1000 | 40 |
| | Film Gauge - 3.0 mils | |
| (D) | LD 100 | 80 |
| | R 500 | 20 |
| | Film Gauge - 1.5 mils | |
| (E) | LD 100 | 80 |
| | R 2000 | 20 |
| | Film Gauge - 5.0 mils | |

EXAMPLE II

According to the procedure of example I film was made from mixtures of polyethylene resin, amorphous polypropylene resin and isotactic polypropylene resin. Some of the formulas are:

| A. | LD 100 | 70 |
|---|---|---|
| | R 1000 | 24 |
| | 6323 | 6 |
| | Film Gauge - 0.5 mils | |
| B. | LD 100 | 89 |
| | R 1000 | 10 |
| | 6323 | 1 |
| | Film Gauge - 2.0 mils | |
| C. | LD 100 | 50 |
| | R 1000 | 40 |
| | 6323 | 10 |
| | Film Gauge - 10 mils | |

EXAMPLE III

According to the procedure of Examples I and II additives and pigments were incorporated into the blend compositions. Some of the formulas are:

| A. | LD 100 | 69.95 |
|---|---|---|
| | R 1000 | 30.00 |
| | Oleamide | 0.05 |
| | Film Gauge - 3.0 mils | |
| B. | LD 100 | 65 |
| | R 1000 | 30 |
| | Ti O$_2$ R 1000 | 5 |
| | Film Gauge - 1.5 mils | |
| C. | LD 100 | 65.0 |
| | R 1000 | 30.0 |
| | T.O$_2$ R 100 | 2.5 |
| | Yellow Oxide 205 (Reichhold Coulston) | 2.5 |
| | Film Gauge - 1.5 mils | |
| D. | LD 100 | 55 |
| | R 1000 | 30 |
| | Carbon Black SRF (Cabot Corp.) | 3 |
| | Film Gauge - 2.0 mils | |
| E. | LD 100 | 55 |
| | R 1000 | 30 |
| | Camel Tex | 15 |
| | Film Gauge - 1.5 mils | |
| F. | LD 100 | 60 |
| | R 1000 | 30 |
| | DuPont 3180 EVA | 10 |
| | Film Gauge - 2.5 mils | |

EXAMPLE IV

According to the procedures of Example 1-3, the blend compositions were extruded through a die and subsequently cut into a plurality of square or cylendrically shaped pellets. These pellets can be used as compounds for extrusion of thermoplastic articles or as additives or color concentrates for further let down with a virgin polyethylene resin to form the finished thermoplastic article.

In the case of high percentage leading of the additive, the mixture can be subjected, prior to extrusion, to intensive mixing in a blender such as a Henschel. Some examples are:

| A. | R 1000 | 50 |
|---|---|---|
| | TiO$_2$ R 100 | 50 |
| B. | R 1000 | 38.0 |
| | TiO$_2$ R 100 | 30.4 |
| | Yellow Oxide 205 | 15.0 |
| | Red Oxide (Pfizer) | 0.5 |
| | Carbon Black SRF | 0.1 |
| | Camel Tex | 15.0 |
| | Zinc Stearate | 1.0 |
| C. | R 1000 | 10.0 |
| | Camel Tex | 90.0 |
| D. | R 1000 | 30 |
| | TiO$_2$ | 50 |
| | 6323 | 20 |
| E. | R 1000 | 47 |
| | 6323 | 3 |
| | TiO$_2$ | 50 |
| | Zinc Stearate | 1 |
| F. | R 1000 | 20 |
| | 6323 | 10 |
| | Camel Tex | 70 |
| G. | R 1000 | 35 |
| | TiO$_2$ R 100 | 30 |
| | EVA duPont 3185 | 30 |
| | 6323 | 5 |
| H. | R 1000 | 60 |
| | TO$_2$ R 100 | 20 |
| | 6323 | 20 |

The thermoplastic films made from a letdown of the aforementioned concentrates with virgin polyethylene resin (letdown of about 5/1 to about 50/1 exhibited excellent dispersion as well as imparting improved optical density and elongation to the film. The raw material cost for producing a pound of film with these aforementioned concentrates is substantially reduced as compared to concentrates produced from low density polyethylene due to the lower raw material cost of the amorphous polypropylene as compared to that of virgin low density polyethylene resin.

The aforementioned concentrates can also be readily letdown with low, medium or high density polyethylene resins in the formation of thermoplastic articles and can be readily employed in sheet extrusion, injection molding, blow molding, extrusion lamination or extrusion coating. These aforementioned concentrates can also be readily compounded and formed in a Farrel Continuous Mixer or in an intensive mixer such as a Banbury wherein the fluxed mixture is dropped onto a two roll mill and subsequently sheeted or extruded in an extruder into a steel or cylindrically shaped strands.

Additionally, these concentrates can be readily formed in an open kettle, a Baker Perkins or a Cowles mixture. These concentrates require less electrical power demand during compounding than do similar concentrates formed from low density polyethylene resins.

EXAMPLE V

According to the procedure of Example I–III mixtures were extruded through a ribbon shaped die, wherein the resulting thermoplastic mixture is extruded from the ribbon die in a flat continuous hot polymeric strip which is subsequently sandwiched between two paper layers, pressed and cooled to form a composite.

Alternatively to the paper one can use cloth or glass fabrics, board or metallic board. The formulas are:

| A. Chemplex 1016 | 85 |
|---|---|
| R 1000 | 15 |
| B. Chemplex 1016 | 70 |
| R 1000 | 30 |
| C. Chemplex 1016 | 70 |
| R 1000 | 20 |
| Calcium Carbonate | 10 |

EXAMPLE VI

Mixtures of amorphous polypropylene and crystalline polypropylene were prepared in an extruder having a screw with an L/D of 24/1 and a mixing section disposed therein. The resultant hot polymeric strip was shocked, cooled and pelletized. The crystalline polypropylene was strawed fed through the feed throat of the extruders and the amorphous polypropylene was liquefied and pumped into the metering section of the extruder. The formulas are:

| A. Profax 6323 | 15 |
|---|---|
| R 1000 | 85 |
| B. Profax 6323 | 50 |
| R 1000 | 20 |

EXAMPLE VII

A polymeric article was manufactured by extruding a mixture of one of the formulas of Example XI and a polyethylene resin through a shaping die such as tubular die, a cylindrically shaped or a flat ribbon die. The pellets of Example XI are mixed with the virgin polyethylene resin by hand, drum tumbling or in a Henschel mixer.

The resultant mixture was fed into the extruder and extruded at a temperature of at least about 200° F., wherein the resultant mixture was forced through the shaping die. During the mixing step, additives can be added to the blend of pellets of Example IX and polyethylene.

| A. Blown film - tubular die | |
|---|---|
| 1. Pellets of XI-B | 60 |
| LD 100 | 40 |
| | Film Gauge - 2.5 mils |
| 2. Pellets of Example XI-B | 15 |
| LD 100 | 85 |
| | Film Gauge - 0.5 mils |
| 3. Pellets of IX-B | 45 |
| LD 100 | 45 |
| Calcium Carbonate Camel Tex | 10 |
| B. Color and additive concentrates made through a ribbon die. | |
| 1. Pellets of IX-A | 30 |
| R 100 TiO$_2$ | 70 |
| 2. Pellets of IX-B | 100 |
| 3. Pellets of IX-B | 95 |
| Erucamide | 5 |
| 4. Pellets of IX-A | 25.0 |
| R 100 TiO$_2$ | 50.0 |
| Yellow Oxide | 15.0 |
| Carbon Black | 0.3 |
| Red Oxide | 1.5 |
| Calcium Carbonate | 8.2 |

Hence obvious changes may be made in the specific embodiments of the composition of matter or methods of forming the composition of matter of the invention described herein, such modifications being within the spirit and scope of the invention claimed, it is indicated that all matter contained herein is intended as illustrative and not limiting in scope.

What is claimed is:

1. A polyolefinic composition having a non-tacky surface which consists of a homogenous blend of:
   (a) at least 50 wt.% polyethylene resin;
   (b) about 3 to about 20 wt.% of an isotactic polypropylene resin having a density of at least about 0.903 g/cc$^3$; and
   (c) 10 to about 40 wt.% of an amorphous polypropylene resin having a Brookfield viscosity at 375° F. of at least about 10 cps and a molecular weight of at least about 200 as measured by GPC.

2. A composition according to claim 1, wherein said composition further includes at least one additive at a concentration level of at least about 0.01 wt.%, said additive being selected from the group consisting of slip agents, antiblock agents, ultraviolet stabilizers and lubricants and mixtures thereof.

3. A composition according to claim 1, further including a filler.

4. A composition according to claim 1, wherein said composition further includes an elastomer at a concentration level of about 3 to about 20 wt.%.

* * * * *